US012044061B2

(12) United States Patent
Kellum

(10) Patent No.: US 12,044,061 B2
(45) Date of Patent: Jul. 23, 2024

(54) SASH GUIDE

(71) Applicant: Amesbury Group, Inc., Edina, MN (US)

(72) Inventor: Wilbur J. Kellum, Garretson, SD (US)

(73) Assignee: Amesbury Group, Inc., Edina, MN (US)

( * ) Notice: Subject to any disclaimer, the term of this patent is extended or adjusted under 35 U.S.C. 154(b) by 109 days.

(21) Appl. No.: 17/338,913

(22) Filed: Jun. 4, 2021

(65) Prior Publication Data

US 2021/0381301 A1 Dec. 9, 2021

Related U.S. Application Data

(60) Provisional application No. 63/036,120, filed on Jun. 8, 2020.

(51) Int. Cl.
*E06B 3/44* (2006.01)

(52) U.S. Cl.
CPC ........ *E06B 3/44* (2013.01); *E06B 2003/4484* (2013.01)

(58) Field of Classification Search
CPC .............. E05D 15/165; E05D 15/0647; E05D 15/0621; E05D 13/08; E05D 13/04; E06B 3/44; E06B 2003/4484; E06B 7/22; E06B 3/4407; E06B 3/4415; E06B 1/6069
USPC .................. 49/414, 417, 418, 419, 421, 428
See application file for complete search history.

(56) References Cited

U.S. PATENT DOCUMENTS

| | | | | | |
|---|---|---|---|---|---|
| 476,406 | A * | 6/1892 | Pettit | E06B 3/44 | 49/436 |
| 560,356 | A * | 5/1896 | Hull | E06B 3/44 | 292/DIG. 47 |
| 600,283 | A * | 3/1898 | Harris | E06B 3/44 | 49/437 |
| 862,302 | A * | 8/1907 | Benedict | E06B 3/44 | 16/404 |
| 2,287,741 | A * | 6/1942 | Levyn | E06B 3/50 | 292/73 |
| 2,883,226 | A * | 4/1959 | Haynes | E06B 3/44 | 49/428 |
| 3,626,639 | A * | 12/1971 | Di Lucia | E06B 1/6084 | 49/452 |
| 3,822,507 | A * | 7/1974 | Buczkowski | E05D 13/08 | 49/421 |
| 5,655,342 | A * | 8/1997 | Guillemet | E06B 1/60 | 49/505 |
| 8,424,245 | B1 * | 4/2013 | Kunz | E05D 15/22 | 49/185 |

(Continued)

*Primary Examiner* — Daniel P Cahn
*Assistant Examiner* — Patrick B. Ponciano
(74) *Attorney, Agent, or Firm* — Merchant & Gould P.C.

(57) ABSTRACT

A sash guide for a hung window includes a plate having a first end and an opposite second end defining a longitudinal axis. The first end configured to mount to a side rail of a window sash and the second end having an outside surface spaced from the side rail in a transverse direction. The transverse direction being substantially orthogonal to the longitudinal axis. A cam block is disposed proximate the second end and between the plate and the side rail. An adjustment fastener is coupled to the cam block and configured to slide the cam block along the longitudinal axis such that the outside surface of the second end is adjustable along the transverse direction and in relation to the side rail.

18 Claims, 9 Drawing Sheets

(56) References Cited

U.S. PATENT DOCUMENTS

| | | | | |
|---|---|---|---|---|
| 8,448,296 | B2 * | 5/2013 | Kellum, III | E05D 13/1253<br>16/193 |
| 8,733,545 | B2 * | 5/2014 | Weiss | E04F 21/0015<br>206/325 |
| 9,038,315 | B2 * | 5/2015 | Kellum, III | E05D 13/06<br>49/123 |
| 9,895,792 | B2 * | 2/2018 | Chen | B25B 5/10 |
| 2019/0136606 | A1 * | 5/2019 | Grobelny | E06B 1/6069 |
| 2021/0140214 | A1 | 5/2021 | Nau et al. | |

* cited by examiner

SASH GUIDE

CROSS-REFERENCE TO RELATED APPLICATIONS

This application claims priority to and the benefit of U.S. Provisional Application No. 63/036,120, filed Jun. 8, 2020, which is incorporated by reference herein in its entirety.

INTRODUCTION

Window sash guides typically attach to an upper portion of a hung window sash and guides left and right movement of the window sash in operation so as to maintain vertical sliding alignment. At least some known sash guides attach to a top surface of an upper rail, and thereby, are visible on the window sash.

SUMMARY

In an aspect, the technology relates to a sash guide for a hung window, the sash guide including: a plate having a first end and an opposite second end defining a longitudinal axis, the first end configured to mount to a side rail of a window sash and the second end having an outside surface spaced from the side rail in a transverse direction, wherein the transverse direction is substantially orthogonal to the longitudinal axis; a cam block disposed proximate the second end and between the plate and the side rail; and an adjustment fastener coupled to the cam block, wherein the adjustment fastener is configured to slide the cam block along the longitudinal axis such that the outside surface of the second end is adjustable along the transverse direction and in relation to the side rail.

In an example, the plate has a first surface and the cam block has a corresponding second surface, the first and second surfaces cooperating to drive movement of the outside surface of the second end along the transverse direction via operation of the adjustment fastener. In another example, the plate is resiliently deflectable relative to the longitudinal axis. In yet another example, a contact is coupled to the outside surface of the second end of the plate. In still another example, the cam block is supported on the plate along the longitudinal axis. In an example, the first end of the plate is offset from the second end of the plate along the transverse direction. In another example, a channel is defined in the second end of the plate opposite the outside surface, the channel extending along the longitudinal axis and at least partially receiving a portion of the cam block.

In another aspect, the technology relates to a sash guide including: a mounting plate configured to mount to a side rail of a window sash; an arm extending from the mounting plate; a cam block disposed between the arm and the side rail, wherein the cam block is slidable relative to both the arm and the side rail; and an adjustment screw coupled to the cam block and configured to extend from a top rail of the window sash, wherein the adjustment screw is configured to drive the sliding movement of the cam block so as to selectively position a free end of the arm relative to the side rail.

In an example, the free end of the arm includes a T-slot and a contact disposed therein. In another example, the arm has an L-shape with a long leg defining the free end of the arm and being substantially parallel to the mounting plate. In yet another example, the arm includes a shelf configured to at least partially support the cam block. In still another example, the arm has a first surface and the cam block has a corresponding second surface, the first and second surfaces positioned directly against one another. In an example, the sliding direction of the cam block is substantially orthogonal to the positioning movement of the free end of the arm. In another example, the cam block has a projection slidably received at least partially within the free end of the arm.

In another aspect, the technology relates to a window sash including: a top rail; a side rail; and a sash guide including: a plate having a first end and an opposite second end, the first end coupled to the side rail and the second end positioned proximate the top rail with an outside surface selectively positionable a distance from the side rail in a direction that extends along the top rail; a cam block disposed between the second end and the side rail; and an adjustment fastener coupled to the cam block and accessible from the top rail, wherein the adjustment fastener is configured to slide the cam block against the side rail so as to define the distance of the outside surface of the second end relative to the side rail.

In an example, the top rail has an extension that the adjustment fastener extends through. In another example, the adjustment fastener is the only component of the sash guide that extends above the top rail. In yet another example, a rib extends from the first end of the plate and is at least partially received within the side rail. In still another example, the sash guide further includes a shelf extending from the plate towards the side rail and disposed below the cam block such that the cam block is at least partially captured by the shelf, the plate, and the side rail. In an example, a thickness of the cam block is approximately equal to an extension distance of the shelf.

BRIEF DESCRIPTION OF THE DRAWINGS

There are shown in the drawings, examples that are presently preferred, it being understood, however, that the technology is not limited to the precise arrangements and instrumentalities shown.

DETAILED DESCRIPTION

Figure 1:
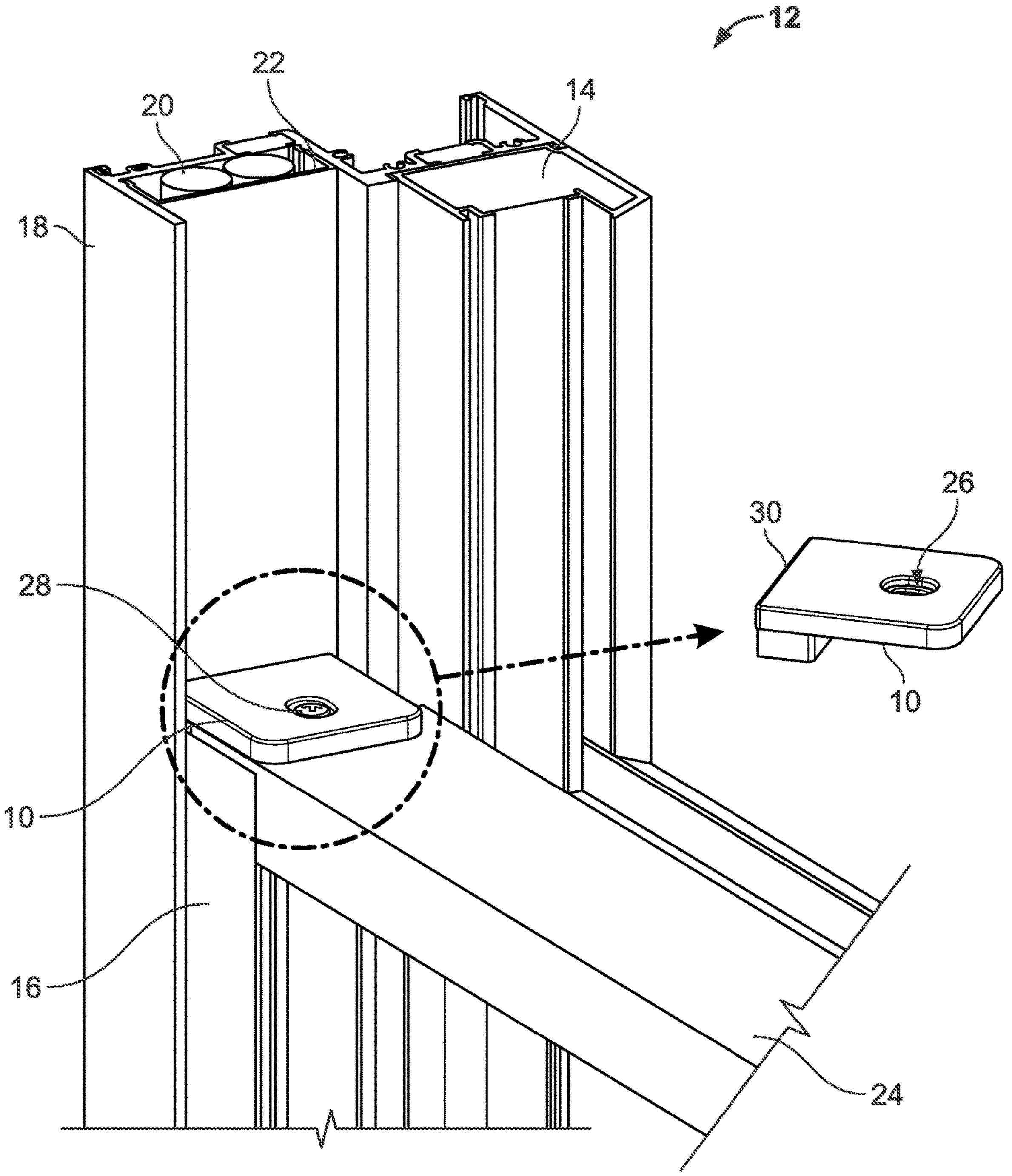
FIG. 1 (Prior Art)
FIG. 1 is a perspective view of a prior art sash guide mounted on a window system.

FIG. 1 is a perspective view of a prior art sash guide 10 mounted on a window system 12. The window system 12 includes an upper sash 14 and a lower sash 16, both supported within a jamb 18. In the example, the window system 12 is a single hung window with a window balance 20 supporting the lower sash 16 so that the lower sash 16 can slidingly open and close. The upper sash 14 is static within the jamb 18. It is appreciated that the window system 12 can alternatively be a double hung window with the upper sash 14 configured to slidingly open and close. The window balance 20 is covered by a balance cover 22 so that the window balance 20 is hidden within the jamb 18. A top rail 24 of the lower sash 16 has the sash guide 10 coupled to it. While a left side of the lower sash 16 is illustrated in FIG. 1, it should be appreciated that additionally or alternatively, the sash guide 10 can be coupled to the right side of the window sash 16.

The sash guide 10 has an elongated opening 26 so that a fastener 28 (e.g., screw) can secure the sash guide 10 to the upper surface of the top rail 24. An end 30 of the sash guide 10 is configured to extend from the top rail 24 and at least partially into the jamb 18 to be positioned directly adjacent the balance cover 22. This position of the sash guide 10 assists in aligning the sash 16 within the jamb 18 regarding left and right guidance (e.g., in the direction of the top rail 24). Because of the elongated opening 26, the extension distance of the end 30 of the sash guide 10 with respect to the sash 16 can be adjusted. This adjustable positioning of the sash guide 10 relative to the top rail 24 accommodates the varying manufacturing tolerances of the window system 12.

As illustrated in FIG. 1, the sash guide 10 is disposed on top of the lower sash 16 and extends into the jamb 18, such that the sash guide 10 is clearly visible on the window system 12. This visibility of the sash guide 10 can undesirably affect the aesthetics of the window sash and/or window system. In the sash guide examples described further below and in reference to FIGS. 2-13, the sash guides described below are configured to be at least partially hidden between the sash and the window jamb so as to increase the visual aesthetics of the window system while still enabling the sash to be guided within the jamb.

Figure 2:
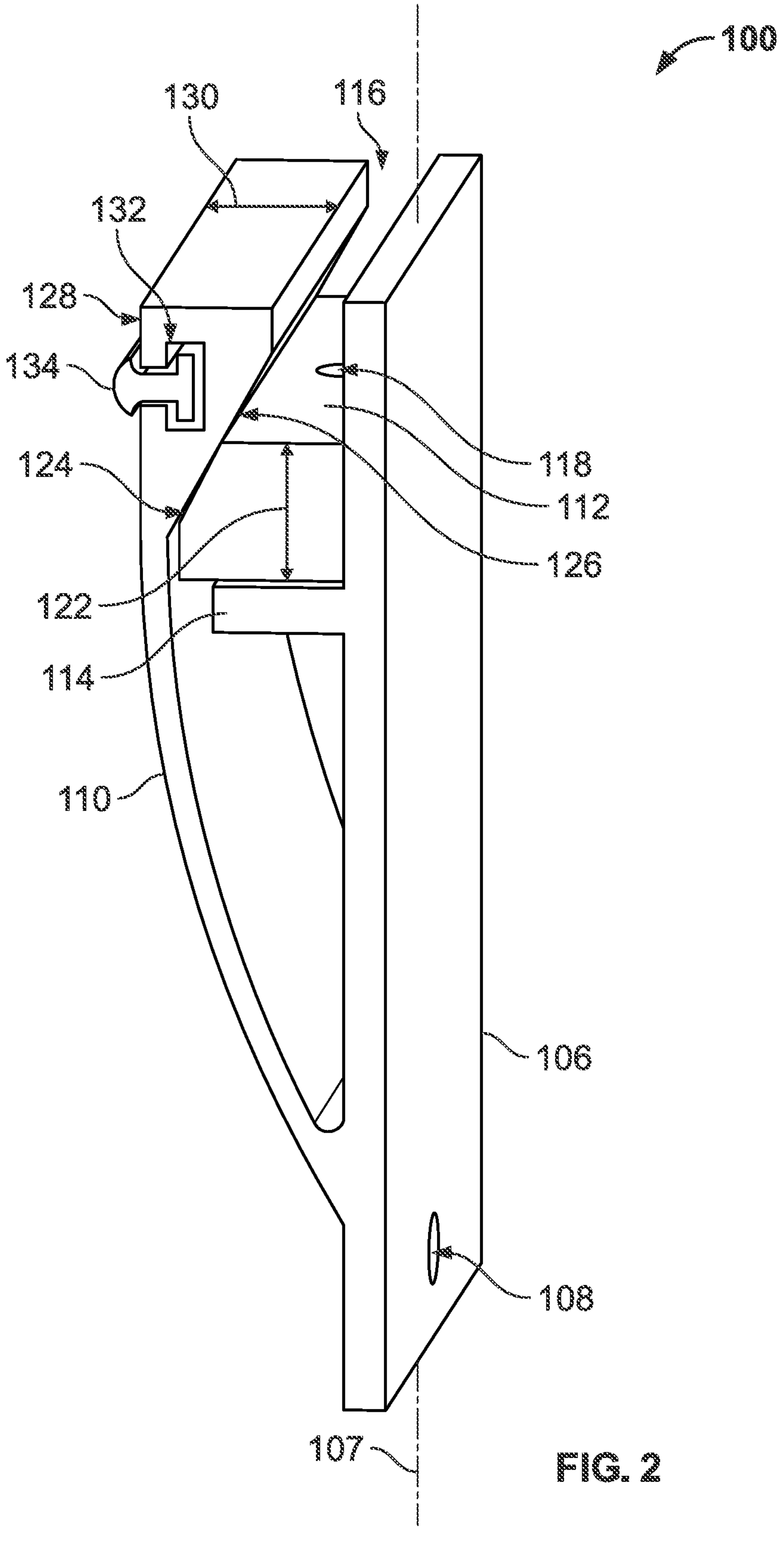
FIG. 2 is a perspective view of an exemplary sash guide.
Figure 6:
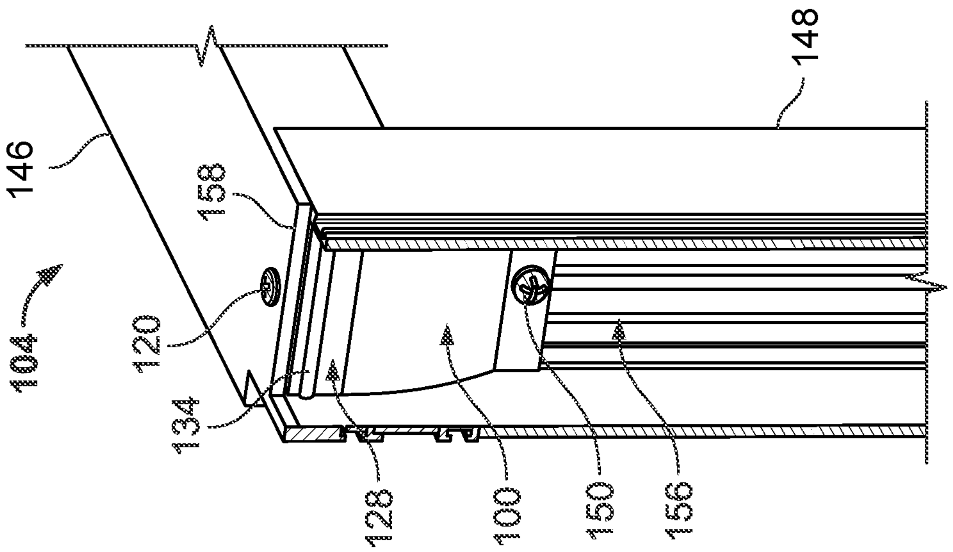
FIG. 6 is a perspective view of the sash guide shown in FIG. 2 mounted on a window sash.

FIG. 2 is a perspective view of an exemplary sash guide 100. The sash guide 100 is configured to couple to a side rail 148 of a window sash 104 and as illustrated in FIG. 6. The sash guide 100 includes a mounting plate 106 defining a longitudinal axis 107 with an aperture 108 at a first end so that a back side of the plate 106 can be secured to the side rail 148 of the window sash 104 (e.g., via fastener 150 shown in FIG. 6). In the example, the aperture 108 is proximate the bottom end of the mounting plate 106. An arm 110 extends from a front side of the plate 106 adjacent to the aperture 108 and extends towards an opposite second end and the top of the mounting plate 106. In an aspect, the free end of the arm 110 is aligned with the top of the mounting plate 106. The arm 110 and the mounting plate 106 are spaced apart from one another in a transverse direction relative to the longitudinal axis 107. A cam block 112 is disposed between the mounting plate 106 and the arm 110 towards the top end of the sash guide 100. A shelf 114 also extends from the front side of the mounting plate 106 towards the arm 110 and at least partially retains the cam block 112 towards the top of the mounting plate 106.

The free end of the arm 110 and the top end of the mounting plate 106 are separated by a gap 116 so that the cam block 112 is accessible from the top of the sash guide 100. The cam block 112 has a hole 118 disposed on a top surface and that is configured to receive an adjustment fastener 120 (shown in FIGS. 3-6), such as, a screw that extends through the gap 116. The cam block 112 is retained between the arm 110 and the mounting plate 106, however, the arm 110 is resiliently deflectable and the cam block 112 is slidable along the front side of the mounting plate 106 in a direction indicated by arrow 122 that is parallel to the longitudinal axis 107 via the adjustment fastener 120. The cam block 112 is thicker than the gap 116 between the top end of the mounting plate 106 and the free end of the arm 110 so that when the cam block 112 slides, movement of the free end of the arm 110 is driven and the size of the gap 116 can be adjusted.

The cam block 112 has a first oblique surface 124 that is on the arm side of the block. The free end of the arm 110 has a corresponding second oblique surface 126 that is on an inside surface of the arm 110 facing the block and the plate. The oblique surfaces 124, 126 are positioned directly against one another and cooperate to drive movement of the arm 110. For example, as the cam block 112 is moved in an upwards direction, via the adjustment fastener 120, an outside surface 128 of the free end of the arm 110 is moved away from the mounting plate 106 and in a direction indicated by arrow 130, thereby increasing the gap 116. Conversely, when the can block 112 is moved in a downwards direction towards the shelf 114, the outside surface 128 of the free end of the arm 110 is moved towards the mounting plate 106 and in the direction of arrow 130, thereby decreasing the gap 116. The movement direction 130 of the free end of the arm 110 is orthogonal to the movement direction 122 of the block 112 and the longitudinal axis 107. This movement of the outside surface 128 of the arm 110, via the adjustment fastener 120, enables adjustment of the sash guide 100 so as to properly fit between the window sash and the jamb and accommodate the varying manufacturing tolerances of the window system.

In the example, the cam block movement direction 122 is substantially orthogonal to the arm movement direction 130. The arm 110 has a resilient spring force (e.g., via shape and/or material properties) that is biased towards the mounting plate 106 and pulls the free end towards the mounting plate 106 when the cam block 112 is lowered. As such, the position of the cam block 112 facilitates automatic movement of the arm 110 as described herein. In some examples, the outside surface 128 of the arm 110 can include a slot 132 (e.g., a T-shaped slot) that receives a foam or other soft compound contact 134 for reducing noise from the sash guide 100 sliding against the jamb.

Figure 4:
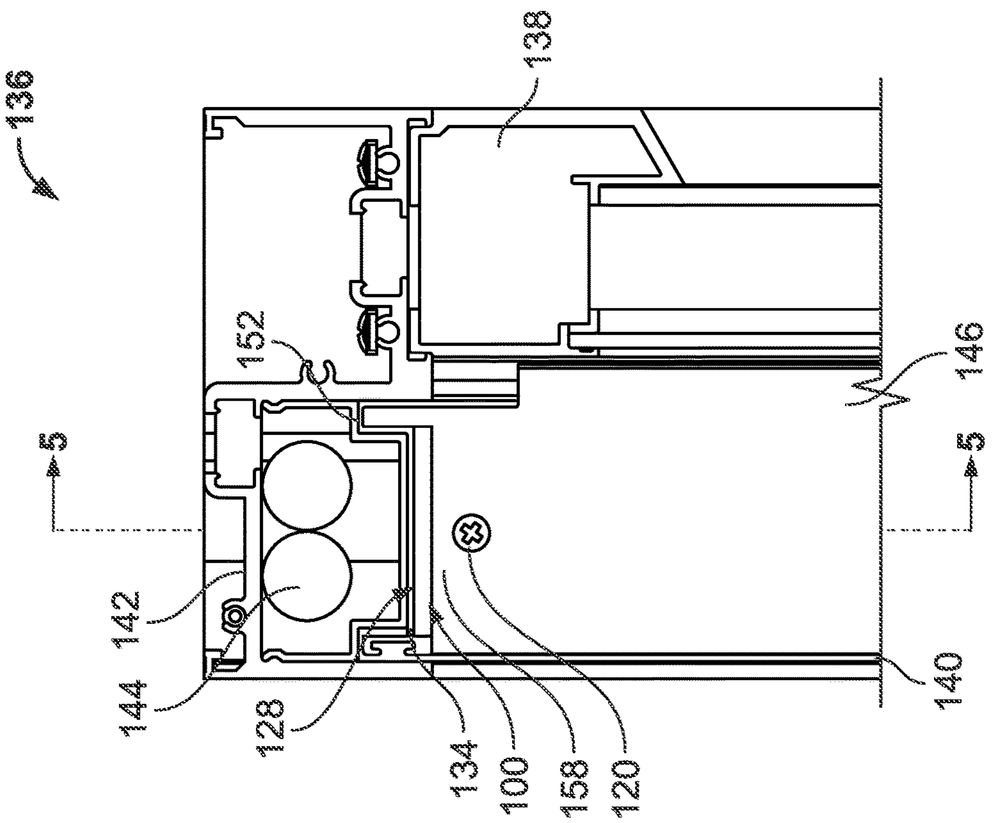
FIG. 4 is a top plan view of the window system with the sash guide.
Figure 3:
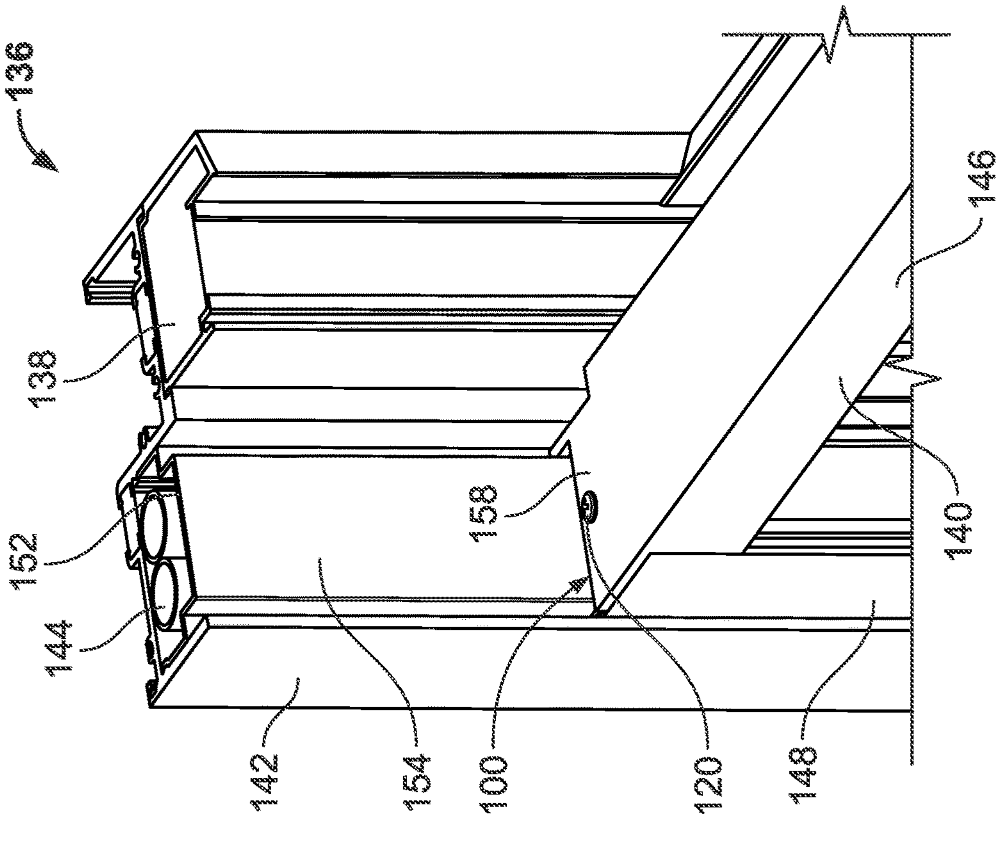
FIG. 3 is a perspective view of a window system with the sash guide shown in FIG. 2 mounted thereon.
Figure 5:
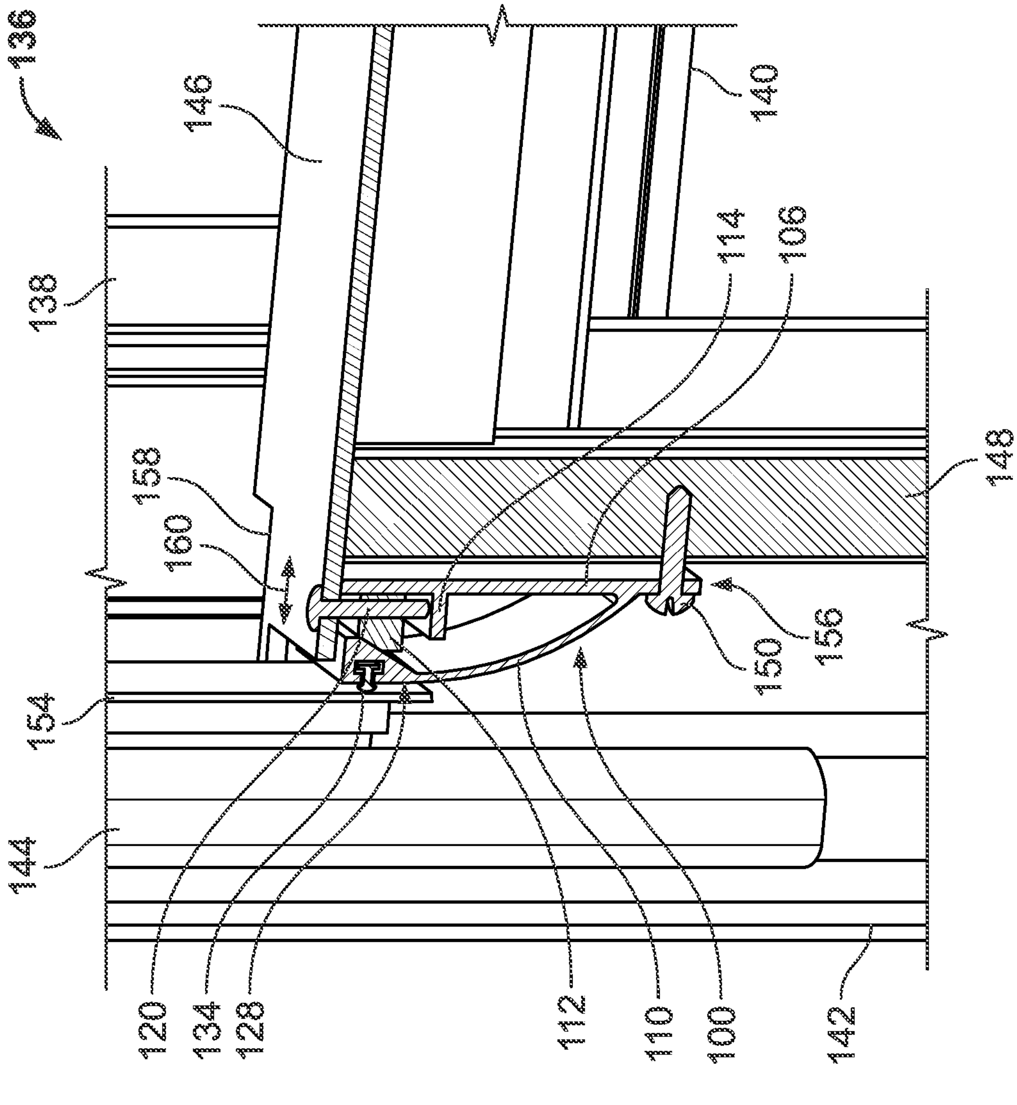
FIG. 5 is a cross-sectional perspective view of the window system and the sash guide taken along line 5-5 in FIG. 4.

FIG. 3 is a perspective view of a window system 136 with the sash guide 100 mounted thereon. FIG. 4 is a top plan view of the window system 136 with the sash guide 100. FIG. 5 is a cross-sectional perspective view of the window system 136 with the sash guide 100 taken along line 5-5 in FIG. 4. Referring concurrently to FIGS. 3-5, certain components are described above and thus not necessarily described further. The window system 136 includes an upper sash 138 and a lower sash 140, both supported within a jamb 142. The window system 136 can be a single hung system or double hung system as required or desired. The lower sash 140 is supported by a window balance 144 and has a top rail 146 and a side rail 148. The sash guide 100 is mounted to the side rail 148 of the window sash 140 by a fastener 150 through the mounting plate 106 and is positioned below the upper surface of the top rail 146. The adjustment fastener 120 is accessible from the top rail 146 and is the only component of the sash guide 100 that extends above the upper surface of the top rail 146 so as to increase the aesthetics of the window system 136.

The window balance 144 is covered by a balance cover 152. In the example, the balance cover 152 extends at least partially around the window balance 144 and couples to both sidewalls of the jamb 142 proximate the base wall. A front wall 154 of the balance cover 152 extends at least partially across the sidewalls of the jamb 142 and in front of the window balance 144. In the example, the front wall 154 includes recesses proximate both of the jamb sidewalls. These recesses are configured to receive portions of the window sash 140. As described above, the adjustment fastener 120 is used to adjust the sash guide 100 so as to position the outside surface 128 and the contact 134 directly adjacent the front wall 154 of the balance cover 152. This positioning restricts and guides the left and right movement of the window sash 140.

In the example, the rails 146, 148 can be an extruded window sash component and each rail shape can include any number of axial extensions or recessed channels. For example, at the corner joint of the top rail 146 and the side rail 148, an outer pocket 156 can be formed. Additionally or alternatively, the top rail 146 includes an extension 158 that projects at least partially over the side rail 148 and at least partially defines the outer pocket 156. In the example, the extension 158 has an extension distance 160 that it extends outward from the portion of the side rail 148 that the sash guide 100 is mounted to. The outer pocket 156 at least partially receives the sash guide 100 and the extension 158 is shaped and sized so that the adjustment fastener 120 extends through the top rail 146 and connect with the cam block 112.

In operation, the mounting plate 106 is secured to the side rail 148 via the fastener 150 so that the free end of the arm 110 and the top end of the mounting plate 106 are disposed adjacent the extension 158 and at least partially within the pocket 156. In an aspect, the top end of the mounting plate 106 can be positioned directly against the extension 158. This position captures the cam block 112 between the arm 110, the mounting plate 106, and the shelf 114, in addition to the cam block 112 being captured between the side rail 148 and the extension 158 of the top rail 146 without requiring the cam block 112 to be directly coupled to the structure of the sash guide 100. It should be appreciated that the cam block 112 can be coupled to the arm 110, the mounting plate 106, and/or the shelf 114 as required or desired so as to increase shipping and installation efficiencies of the sash guide 100. This type of coupling connection also allows the cam block 112 to slidingly move as described herein. The adjustment fastener 120 extends through the extension 158 of the top rail 146 and engages with the cam block 112. In this position on the window sash 140, the sash guide 100 only has the adjustment fastener 120 extending above the top rail 146 and visible to the window operator.

Prior to mounting the window sash 140 within the jamb 142, the adjustment fastener 120 is used (e.g., turned via a screwdriver) so as to lower the position of the cam block 112 and draw the free end of the arm 110 and the outside surface 128 inward towards the side rail 148. In this position of the sash guide 100, the outside surface 128 is positioned proximate the distal end of the extension 158 or inward thereof so that the window sash 140 can clear the features of the jamb 142 while hanging the window sash 140 within the window system 136. Once the window sash 140 is hung, the adjustment fastener 120 is used to adjust the position of the outside surface 128 relative to the balance cover 152 such that left and right movement of the window sash 140 is guided. For example, the adjustment fastener 120 is used to raise the position of the cam block 112 and slide the cam block 112 towards the extension 158, this movement urges the free end of the arm 110 and the outside surface 128 away from the side rail 148 and extended relative to the distal end of the extension 158. In an example, a thickness of the cam block 112 in the cross-sectional direction shown in FIG. 5 can be approximately equal to the extension distance 160 of the extension 158 so that the outside surface 128 is positionable out of the pocket 156 of the window sash 140 as required or desired. Because of manufacturing tolerances of the components of the window system 136, the position of the cam block 112 is selectively adjustable so that the sash guide 100 can more easily be fitted to the location of the balance cover 152 within the window system 136.

FIG. 6 is a perspective view of the sash guide 100 mounted on a window sash 104. The window sash 104 can be an upper or a lower window sash as described above in FIGS. 3-5 and as required or desired. The sash guide 100 is coupled to the side rail 148 of the window sash 104 with the fastener 150 and within the pocket 156 formed by a top rail 146 so that it is recessed at least partially therein. The extension 158 of the top rail 146 extends above the sash guide 100 with the adjustment fastener 120 extending therethrough to the cam block 112 (shown in FIG. 5). The sash guide 100 is assembled onto the sash 104 prior to the sash 104 being installed in the window jamb. As such, before the sash 104 is hung in the jamb, the cam block 112 is lowered so as to bring the outside surface 128 into a retracted position relative to the extension 158 and allowing the sash guide 100 to clear the window balance within the jamb while the sash 104 is being hung. FIG. 6 illustrates this retracted position of the sash guide 100 relative to the window sash 104. Once the window sash 104 is hung within the window jamb, the adjustment fastener 120 is utilized so as to bring the outside surface 128 of the sash guide 100 into proper position with respect to the window jamb and provide left and right movement guidance.

In the example, the contact 134 that is secured to the outside surface 128 extends laterally across the outside surface 128 and orthogonal to both the fastener 150 and the adjustment fastener 120. The contact 134 is disposed proximate the extension 158 of the top rail 146 and is positionable in direct contact with the balance cover 152 (shown in FIG. 3) or slightly spaced therefrom. The contact 134 acts as a sliding surface of the sash guide 100 against the balance cover 152 and can reduce noise generated from the sash guide 100 sliding against the cover. Additionally or alternatively, the contact 134 can reduce dirt and debris from accumulating within the jamb.

Figure 7:
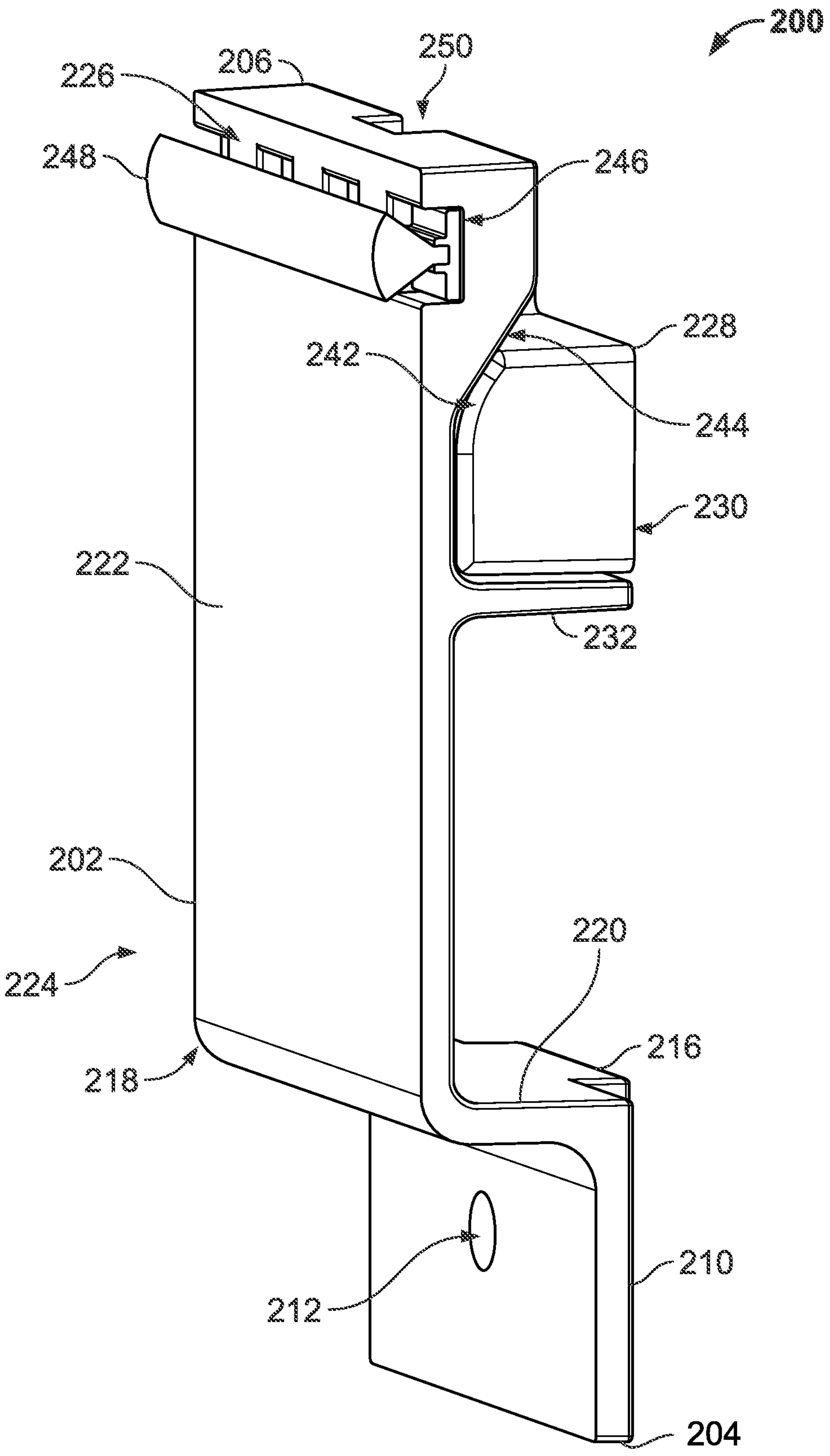
FIG. 7 is a perspective view of another sash guide.
Figure 8:
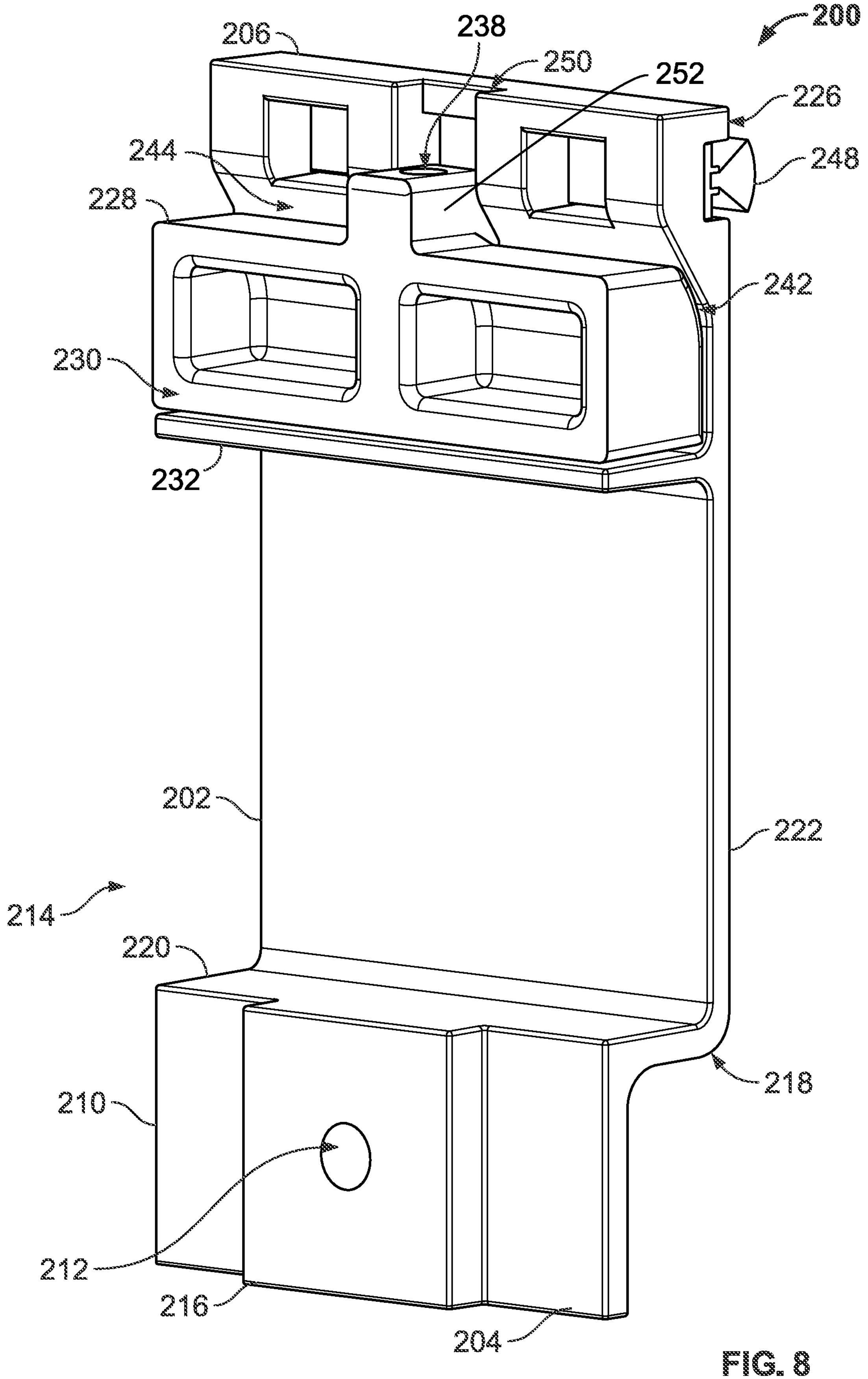
FIG. 8 is another perspective view of the sash guide shown in FIG. 7.
Figure 9:
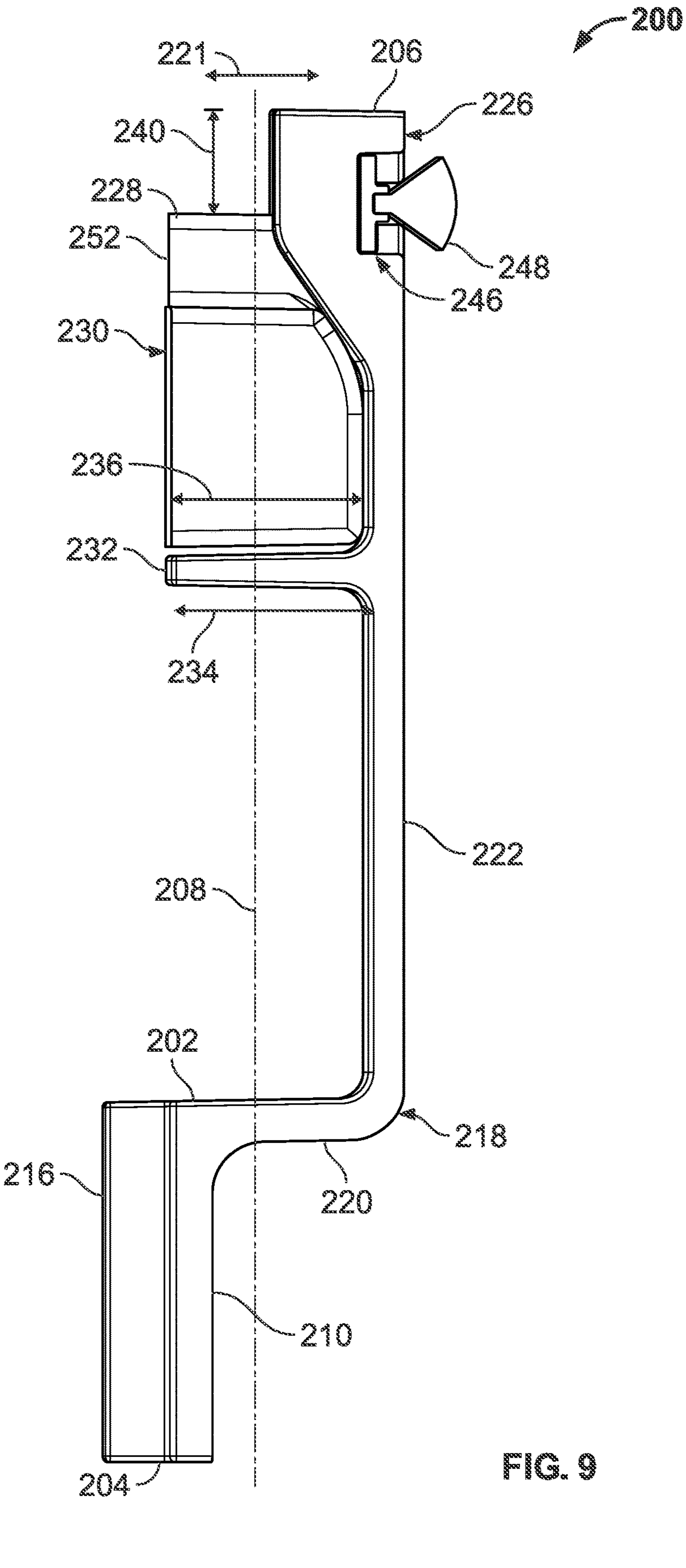
FIG. 9 is a side view of the sash guide shown in FIG. 7.

FIG. 7 is a perspective view of another sash guide 200. FIG. 8 is another perspective view of the sash guide 200. FIG. 9 is a side view of the sash guide 200. Referring concurrently to FIGS. 7-9, and similar the sash guide 100 described above, the sash guide 200 is configured to mount to a window sash and be adjustable to guide left-right movement of the sash. In this example, the sash guide 200 includes a plate 202 having a first end 204 and an opposite second end 206 defining a longitudinal axis 208. At the first end 204 is a mounting plate 210 having an aperture 212 defined therein so that a back side 214 of the plate 202 can be secured to the side rail of the window sash. A rib 216 extends from the back side 214 of the mounting plate 210 and in a direction of the longitudinal axis 208. The rib 216 strengthens the plate 202 and can be at least partially received within the side rail of the window sash when mounted thereto.

The plate 202 also includes a substantially L-shaped arm 218 that extends from the mounting plate 210 with a short leg 220 extending from the top of the mounting plate 210 in a transverse direction 221 from the longitudinal axis 208 and a long leg 222 extending substantially parallel to the mounting plate 210 along the longitudinal axis 208 but offset therefrom by the length of the short leg 220. The short leg 220 extends towards a front side 224 of the plate 202 and the long leg 222 is substantially parallel to the mounting plate 210. The free end of the long leg 222 also forms the second end 206 of the plate 202 that is configured to be positioned proximate the top rail of the window sash. As such, the first end 204 of the plate 202 is offset from the second end 206 of the plate 202 along the transverse direction 221 relative to the longitudinal axis 208. The second end 206 has an outside surface 226 on the front side 224 that is configured to be selectively positionable from the side rail in the transverse direction 221 via a cam block 228. The transverse direction 221 is substantially orthogonal to the longitudinal axis 208, and is in the front-back direction and along the direction that the top rail extends on the window sash.

The cam block 228 is disposed proximate the second end 206, and in this example, is positioned between the plate 202 and the side rail when the sash guide 200 is mounted to the window sash. As such, a rear side 230 of the cam block 228 is directly adjacent to the side rail. The cam block 228 is slidable along the longitudinal axis 208 and relative to both the arm 218 and the side rail. A shelf 232 extends along the transverse direction 221 from the back side 214 of the arm 218 and is substantially parallel to, but offset from, the short leg 220 and closer towards the second end 206. The shelf 232 extends towards the side rail when installed thereon and is disposed below the cam block 228. The shelf 232 is configured to at least partially support the cam block 228 on the plate 202 along the longitudinal axis 208. When the sash guide 200 is mounted on the window sash, the cam block 228 is at least partially captured by the shelf 232, the plate 202, and the window sash.

In the example, the shelf 232 has an extension distance 234 from the back side 214 of the arm 218. A distal end of the shelf 232 can align with the mounting plate 210 along the longitudinal axis 208. At least a portion of a thickness 236 of the cam block 228 along the transverse direction 221 can be approximately equal to the extension distance 234 of the shelf 232. The cam block 228 is disposed on the back side 214 of the plate 202.

The cam block 228 has a hole 238 defined on a top surface and that is configured to receive an adjustment fastener (e.g., adjustment screw 120 shown in FIGS. 3-6). As described above, the adjustment fastener couples to the cam block 228 and is configured to extend from the top rail of the window sash. The adjustment fastener engages with the cam block 228 to slidingly lift and lower the cam block 228 relative to the shelf 232 and in a direction along the longitudinal axis 208 indicated by arrow 240. This movement of the cam block 228 allows the outside surface 226 of the second end 206 of the plate 202 to be adjustable along the transverse direction 221 while the first end 204 and the mounting plate 210 is fixed to the side rail. In the example, the adjustment fastener is rotatable about a fastener axis, parallel to the longitudinal axis 208, to drive the sliding movement of the cam block 228 and position the second end 206 of the sash guide 200 relative to the side rail. Because the cam block 228 is positioned directly against the side rail and captured by the plate 202, the rear side 230 of the cam block 228 slides directly against the slide rail of the window sash and the cam block 228 does not rotate.

The cam block 228 has a curved surface 242 disposed opposite of the rear side 230. An oblique surface 244 is formed on the back side 214 of the second end 206 of the arm 218 facing the cam block 228. The curved surface 242 and the oblique surface 244 are positioned directly against one another so as to cooperate and as the cam block 228 slides along the direction 240, the outside surface 226 of the second end 206 of the plate 202 is selectively positioned along the transverse direction 221 via operation of the adjustment fastener. This movement of the outside surface 226 of the long leg 222, via the adjustment fastener and the cam block 228, enables adjustment of the sash guide 200 so as to properly fit between the window sash and the jamb and accommodate the varying manufacturing tolerances of the window system. In an aspect, the curved surface 242 may be an oblique surface as required or desired.

In the example, the position of the cam block 228 defines the position of the outside surface 226 along the transverse direction 221 and relative to the side rail when mounted thereto. For example, the higher the cam block 228 is positioned on the long leg 222, the further the position of the second end 206 is driven outwards relative to the side rail. Conversely, the lower the cam block 228 is positioned on the long leg 222, the closer the position of the second end 206 is relative to the side rail. When the cam block 228 is positioned adjacent the shelf 232, the outside surface 226 is at its most retracted position. The sliding direction 240 of the cam block 228 is substantially orthogonal to the positioning movement of the free end of the arm 218 along the transverse direction 221. The plate 202 is resiliently deflectable relative to the longitudinal axis 208 so that the position of the cam block 228 can automatically define the position of the second end 206. In an aspect, the arm 218 has a resilient spring force (e.g., via shape and/or material properties) that pulls the second end 206 in a direction towards the back side 214 and enables the cam block 228 to facilitate movement of the arm 218 as described herein.

The outside surface 226 of the long leg 222 can include a slot 246 (e.g., a T-shaped slot) that receives a foam or other soft compound contact 248 for reducing noise from the sash guide 200 sliding against the jamb. The contact 248 may extend at least partially from the outside surface 226 and can be inserted from the sides of the slot 246. In an example, the contact 248 may include a backing with a tufted material extending therefrom.

In this example, the cam block 228 is retained by the rear side of the arm 218 and the side rail of the window sash. As such, the rear side 230 of the cam block 228 is configured to slide directly against the window sash. In this example, the L-shape of the arm 218 can be more efficiently manufactured when compared to the curved arm shape described above in FIGS. 2-6. In an example, the cam block 228 can vertically move about 0.3 inches along direction 240, which corresponds to about a 0.2 inch horizontal movement of the second end 206 of the plate 202 along the transverse direction 221. It should be appreciate that other movement ratios are also contemplated herein for the sash guide 200.

A longitudinally extending channel 250 is defined in the second end 206 of the plate 202 opposite of the outside surface 226. The channel 250 is shaped and sized to at least partially receive a projection 252 extending from the top of the cam block 228. In the example, the hole 238 is defined in the projection 252. This engagement between the cam block 228 and the second end 206 of the plate 202 enables more efficient sliding movement of the cam block 228 during operation of the sash guide 200.

Figure 11:
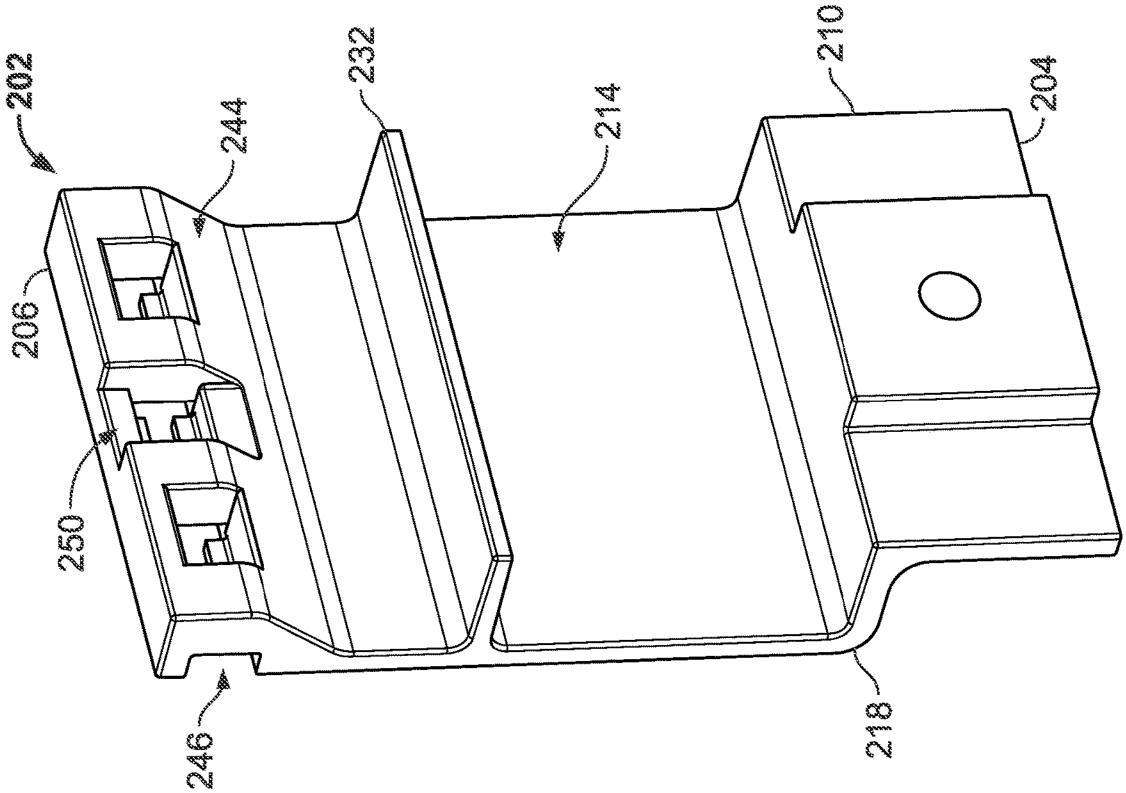
FIG. 11 is another perspective view of the plate of the sash guide.
Figure 10:
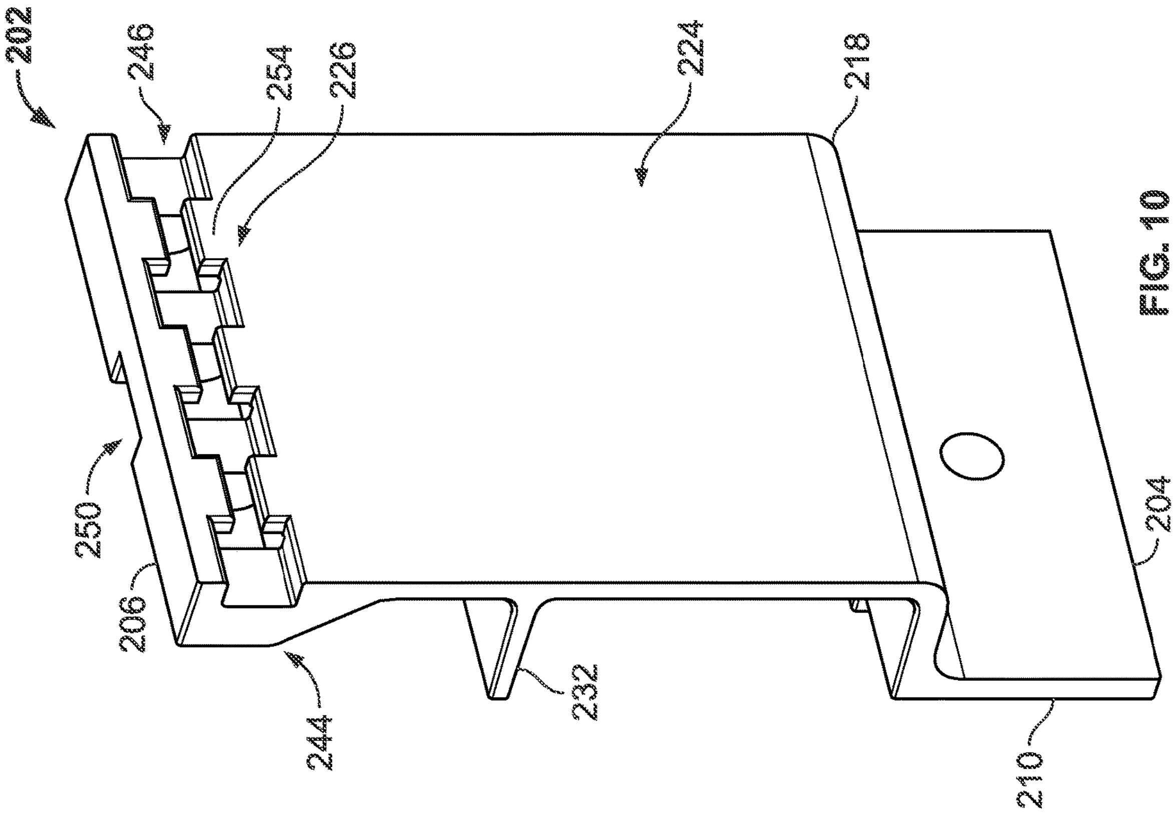
FIG. 10 is a perspective view of a plate of the sash guide shown in FIGS. 7-9.

FIG. 10 is a perspective view of the plate 202 of the sash guide 200 (shown in FIGS. 7-9). FIG. 11 is another perspective view of the plate 202. Referring concurrently to FIGS. 10 and 11, the plate 202 has the mounting plate 210 at the first end 204 and the free end of the arm 218 forms the second end 206. The slot 246 is formed on the outside surface 226 of the second end 206 and is used to couple the contact 248 (shown in FIG. 13) to the plate 202. The slot 246 can include one or more retention steps 254 configured to retain the contact 248 within the slot 246 and facilitate a more efficient installation process of the contact 248. In an aspect, the plate 202 may not include the contact 248 and the outside surface 226 of the second end 206 is devoid of the slot 246 so that the surface itself is configured to be positioned directly adjacent the balance cover.

The second end 206 of the plate 202 has an enlarged thickness defined between the back side 214 and the front side 224 compared to the remainder of the plate 202. This enlarged thickness increases the strength of the second end 206 that is configured to engage with the balance cover. Additionally, the enlarged thickness enables the oblique surface 244 to be formed on the back side 214, as well as, the channel 250 and the slot 246. The channel 250 extends along the longitudinal axis with the top end open at the second end 206 and the bottom end formed at least partially within the oblique surface 244. The channel 250 extends in a direction that is substantially orthogonal to both the shelf 232 and the slot 246. The slot 246 and the channel 250 are adjacent to one another in the transverse direction 221 (shown in FIG. 9).

Figure 12:
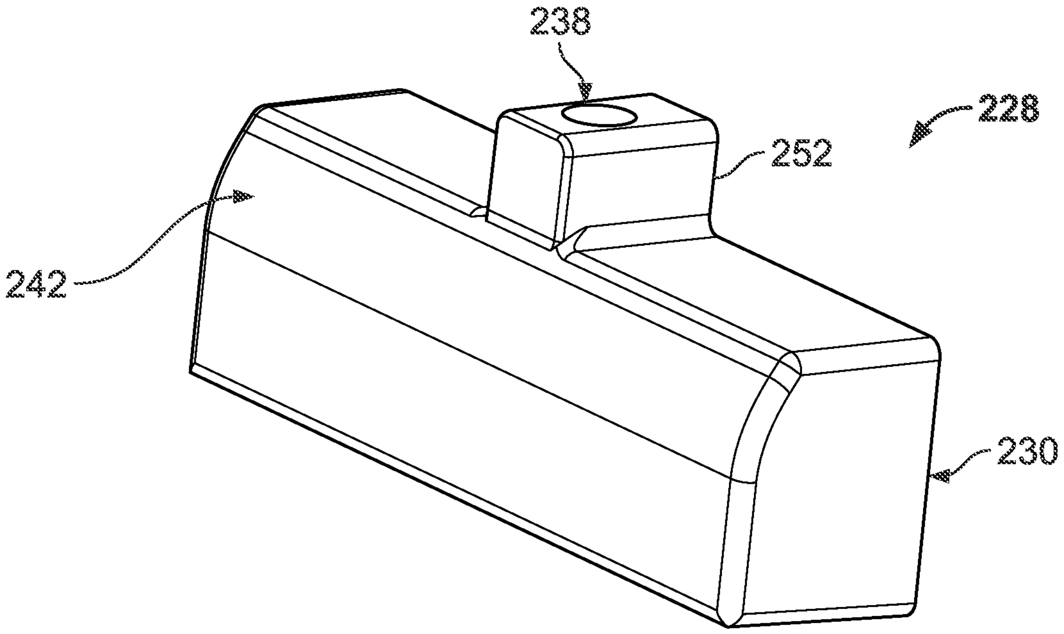
FIG. 12 is a perspective view of a cam block of the sash guide shown in FIGS. 7-9.

FIG. 12 is a perspective view of the cam block 228 of the sash guide 200 (shown in FIGS. 7-9). The cam block 228 is configured to be disposed between the plate 202 (shown in FIGS. 10-11) and the side rail of the window sash, and vertically slide relative thereto. The cam block 228 has the rear side 230 configured to slide against the side rail and a projection 252 extending from the top of the body. The hole 238 configured to receive the adjustment fastener is defined in the projection 252, and the projection 252 is configured to be at least partially received within the channel 250 (shown in FIG. 11) of the plate 202 so as to guide the vertical sliding movement of the cam block 228. As such, the projection 252 is formed from a plurality of planar surfaces. Opposite of the rear side 230, the cam block 228 include the curved surface 242 that is configured to cooperate with the oblique surface 244 (shown in FIG. 11) of the plate 202 and resiliently deflect at least a portion of the plate 202. In an aspect, the curved surface 242 may be a planar oblique surface as required or desired.

Figure 13:
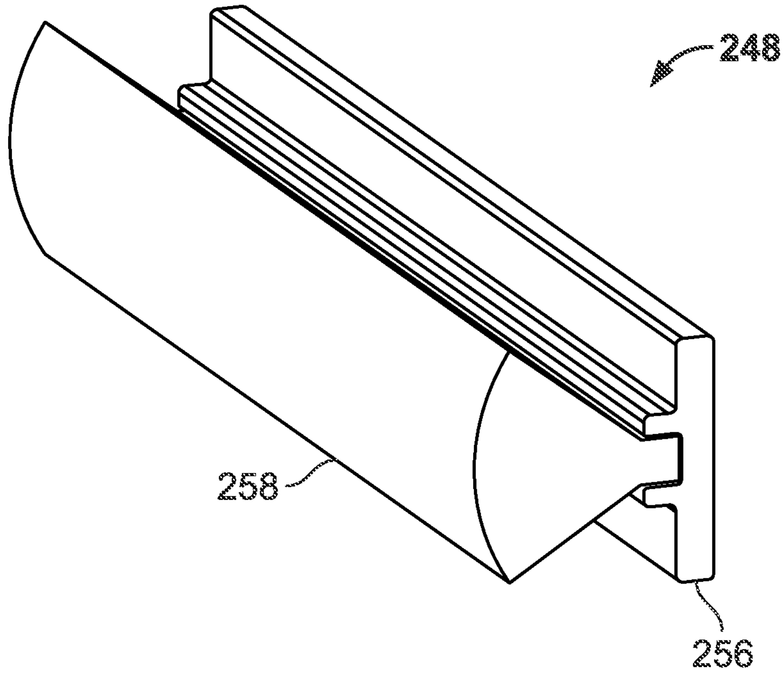
FIG. 13 is a perspective view of a contact of the sash guide shown in FIGS. 7-9.

FIG. 13 is a perspective view of the contact 248 of the sash guide 200 (shown in FIGS. 7-9). The contact 248 include a backing 256 that is configured to be received at least partially within the slot 246 of the plate 202 (both shown in FIG. 10). A tufted material 258 extends from the backing 256 and is configured as the soft contact material that slides against the balance cover.

The materials utilized in the manufacture of the sash guide components described herein may be those typically utilized for window component manufacture, e.g., zinc, steel, aluminum, brass, stainless steel, etc. Molded plastics, such as PVC, polyethylene, etc., may be utilized for the various components. Material selection for most of the components may be based on the proposed use of the sash guide. Appropriate materials may be selected for systems used on particularly heavy panels, as well as on systems subject to certain environmental conditions (e.g., moisture, corrosive atmospheres, etc.). In an aspect, the plate and arm of the sash guide can be formed from aluminum, PVC, or injections molded so as to generate the required resilient strength and movement, while the cam block can be formed from nylon.

While there have been described herein what are to be considered exemplary and preferred examples of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A sash guide comprising:

a mounting plate defining a longitudinal axis and configured to mount to a side rail of a window sash;

an arm extending from the mounting plate, the arm having an inside surface and an outside surface, the arm also having a bottom end and an opposite top end extending substantially along the longitudinal axis, the bottom end of the arm extending from the mounting plate, the top end of the arm having a free end offset from the mounting plate in a transverse direction, wherein the transverse direction is substantially orthogonal to the longitudinal axis, the free end of the arm defines an oblique surface on the inside surface of the arm, the free end of the arm also has a width defined along the transverse direction and between the inside surface and the outside surface with the inside surface and the outside surface being opposite relative to one another along the transverse direction, a top-most section of the oblique surface relative to the longitudinal axis is larger in the width along the transverse direction than a bottom-most section of the oblique surface such that the oblique surface tapers inwardly from the top-most section being enlarged towards the bottom-most section being narrower relative to the transverse direction;

a cam block disposed against the inside surface of the arm at the oblique surface of the free end, wherein the cam block is slidable relative to the arm; and an adjustment screw coupled to the cam block and extending parallel to the longitudinal axis such that the adjustment screw extends past the top end of the arm along the longitudinal axis, the adjustment screw configured to extend from a top rail of the window sash, wherein the adjustment screw is configured to drive the sliding movement of the cam block so as to selectively position the outside surface of the free end of the arm relative to the side rail.

2. The sash guide of claim 1, wherein the free end of the arm comprises a T-slot and a contact disposed therein.

3. The sash guide of claim 1, wherein the cam block has a corresponding oblique surface to the oblique surface of the arm, the oblique surfaces positioned directly against one another.

4. The sash guide of claim 1, wherein the sliding movement of the cam block is substantially orthogonal to the positioning movement of the free end of the arm.

5. The sash guide of claim 1, wherein the arm has a curved shape with the free end of the arm aligned with a top of the mounting plate.

6. The sash guide of claim 1, wherein the mounting plate includes a shelf configured to at least partially support the cam block.

7. The sash guide of claim 1, wherein the arm is resiliently deflectable relative to the mounting plate.

8. The sash guide of claim 1, wherein a contact is coupled to the outside surface of the free end of the arm.

9. The sash guide of claim 1, wherein the cam block is supported by the mounting plate along the longitudinal axis.

10. The sash guide of claim 1, wherein the cam block is disposed between the arm and the mounting plate.

11. A sash guide for a hung window, the sash guide comprising:

a mounting plate having a first end and an opposite second end defining a longitudinal axis, the mounting plate also having a front side, wherein the mounting plate is configured to mount to a side rail of a window sash;

an arm extending from the front side of the mounting plate and extending along the longitudinal direction towards the second end of the mounting plate, the arm having a free end spaced from the front side of the mounting plate in a transverse direction such that a gap is formed between the free end of the arm and the front side of the mounting plate, wherein the transverse direction is substantially orthogonal to the longitudinal axis;

a cam block disposed proximate the second end and between the free end of the arm and the front side of the mounting plate, the cam block defining a hole on a top surface and having an opposite bottom surface;

an adjustment fastener coupled to the cam block at the hole, the adjustment fastener extending along the longitudinal axis through the gap between the free end of the arm and the front side of the mounting plate, wherein the adjustment fastener is configured to slide the cam block along the longitudinal axis such that the free end of the arm is adjustable along the transverse direction and in relation to the mounting plate; and a shelf extending from the front side of the mounting plate in the transverse direction towards the arm, the shelf is spaced apart from the arm in the transverse direction, wherein a first side of the shelf faces the bottom surface of the cam block and is configured to support the cam block along the longitudinal axis, and an opposite second side of the shelf facing an intersection of the arm and the mounting plate and is spaced apart via a gap from the intersection of the arm and the mounting plate in the longitudinal direction.

12. The sash guide of claim 11, wherein the free end of the arm is aligned with the second end of the mounting plate.

13. The sash guide of claim 11, wherein the arm is resiliently deflectable.

14. The sash guide of claim 13, wherein the arm is biased in a direction towards the mounting plate.

15. The sash guide of claim 11, wherein the arm has a first surface and the cam block has a corresponding second surface, the first and second surfaces are cooperating to drive movement of the free end of the arm along the transverse direction via operation of the adjustment fastener.

16. The sash guide of claim 15, wherein the first surface and the second surface are oblique surfaces.

17. The sash guide of claim 11, wherein the arm includes a contact compound disposed opposite of the cam block.

18. The sash guide of claim 11, wherein the adjustment fastener is a screw.

* * * * *